United States Patent
Volkov et al.

(10) Patent No.: US 11,132,137 B2
(45) Date of Patent: Sep. 28, 2021

(54) METHODS AND SYSTEMS FOR PROVIDING READ-OPTIMIZED SCALABLE OFFLINE DE-DUPLICATION FOR BLOCKS OF DATA

(71) Applicant: Acronis International GmbH, Schaffhausen (CH)

(72) Inventors: Oleg Volkov, Moscow (RU); Andrey Zaitsev, Moscow (RU); Stanislav Protasov, Moscow (RU); Serguei Beloussov, Costa del Sol (SG)

(73) Assignee: Acronis International GmbH, Schaffhausen (CH)

(*) Notice: Subject to any disclaimer, the term of this patent is extended or adjusted under 35 U.S.C. 154(b) by 12 days.

(21) Appl. No.: 16/778,389

(22) Filed: Jan. 31, 2020

(65) Prior Publication Data

US 2021/0240376 A1    Aug. 5, 2021

(51) Int. Cl.
  *G06F 12/00* (2006.01)
  *G06F 3/06* (2006.01)
  *G06F 13/00* (2006.01)
  *G06F 13/28* (2006.01)

(52) U.S. Cl.
  CPC .......... *G06F 3/0641* (2013.01); *G06F 3/067* (2013.01); *G06F 3/0614* (2013.01); *G06F 3/0653* (2013.01); *G06F 3/0656* (2013.01)

(58) Field of Classification Search
  CPC ...... G06F 3/0641; G06F 3/0656; G06F 3/067; G06F 3/0614; G06F 3/0653
  See application file for complete search history.

(56) References Cited

U.S. PATENT DOCUMENTS

| | | | |
|---|---|---|---|
| 2004/0243807 A1* | 12/2004 | Hughes | G06F 21/64 713/176 |
| 2011/0289281 A1* | 11/2011 | Spackman | G06F 12/0223 711/154 |
| 2012/0150826 A1* | 6/2012 | Vijayan Retnamma | G06F 16/22 707/692 |
| 2016/0306560 A1* | 10/2016 | Maranna | G06F 3/067 |
| 2017/0192712 A1* | 7/2017 | Kenkre | G06F 3/0619 |
| 2018/0253255 A1* | 9/2018 | Jain | G06F 3/0673 |
| 2019/0332303 A1* | 10/2019 | Watkins | G06F 3/0664 |
| 2020/0349035 A1* | 11/2020 | Upadhyay | G06F 11/1464 |

* cited by examiner

*Primary Examiner* — Mark A Giardino, Jr.
(74) *Attorney, Agent, or Firm* — Arent Fox LLP; Michael Fainberg

(57) ABSTRACT

Disclosed herein are systems and method for read-optimized de-duplication of blocks of data. In one aspect, an exemplary method comprises for each page of a newly received block of data, computing a page hash and assigning a page context ID, computing an index of a page node for storing the page and selecting the page node, when the selected page node contains a copy of the page, adding a page reference to a block descriptor with the page being referenced by the page hash augmented by the page context ID, otherwise, storing the page in plain storage; and for the block of data, storing the block descriptor in a block node of the de-duplication engine, the block of data being referenced by a block hash and the block descriptor containing at least a list of pages of the block stored in page nodes of the de-duplication engine.

17 Claims, 10 Drawing Sheets

METHODS AND SYSTEMS FOR PROVIDING READ-OPTIMIZED SCALABLE OFFLINE DE-DUPLICATION FOR BLOCKS OF DATA

FIELD OF TECHNOLOGY

The present disclosure relates to the field of distributed block storage of data, and, more specifically, to systems and methods for providing read-optimized scalable offline de-duplication for software defined distributed block storage.

BACKGROUND

De-duplication of storage data refers to a method of finding identical data fragments in storage and storing only a single copy of each such fragment—thereby eliminating duplicates. De-duplication techniques are typically applied for archived data or Virtual Machines (VM) images, where there is a high probability of finding substantial amount of duplicated data.

The de-duplication of archival storage is typically performed online while processing new data. For online de-duplication, content-based chunking techniques are proven as being the most effective. However, online de-duplication involves significant processing overhead and adversely impacts storage writing performance. In order to reduce the impact on storage writing performance, offline de-duplication techniques are used for de-duplication of VM images. During offline de-duplication, the data is processed after being written to the storage.

The most common offline de-duplication technique is based on splitting data onto page-sized blocks (4k bytes in size), finding some hash of the content of the block, and locating identical blocks. The locating of identical blocks includes first comparing hash values, and then checking the content of the blocks having similar hashes for an exact match. Applying such technique to large scale distributed software defined storage creates many challenges. First, comparing every page-sized block to every other block does not scale well. Second, making the storage of the de-duplicated data scalable is not a trivial task. Third, locating and removing data that is no longer needed is especially hard problem for a distributed de-duplicated storage system. In order to accomplish the removal of data that is no longer needed, the system has to maintain reference count for every data fragment, which is not feasible in a distributed system without significant performance and storage overhead.

Another approach for performing the offline de-duplication is based on splitting data into data blocks of relatively larger size, e.g., 1 Mb data blocks, finding a set of seed blocks that are similar to each other and moving their content to the de-duplication engine, processing newly received data blocks to be stored near seed blocks that are similar to the newly received data blocks. This approach is facilitated by first organizing the de-duplication engine as sharded set of services that enable splitting large homogenous types of data into multiple databases and scaling in response to a change in a size of a service being built. This approach addresses the scalability concerns to some extent. However, processing read requests may be highly inefficient. For example, suppose the read request is for a sequential data region which would typically comprise tens to hundreds of pages. The page node that stores a particular page may be chosen based on a hash value. The node sharding may be performed based on the hash value of the content. Then, pages located close to each other in the original data block are likely to be placed on different page nodes. Consequently, pages accessed during read requests may be scattered across the cluster. In order to satisfy a single read request, a large number of requests for reading individual pages may then be issued. Thus, this approach may result in inefficiency during read request processing. The inefficiency becomes even worse for physical storages with rotational drives. For instance, the processing of the read request may involve disk head positioning/repositioning for every single page that is read.

Therefore, there is a need for a scalable offline de-duplication method and system that addresses the shortcomings described above.

SUMMARY

Aspects of the disclosure relate to the field of distributed block storage of data. In particular, aspects of the disclosure describe methods and systems for providing a read-optimized scalable offline de-duplication of data for a distributed software defined block storage.

In one exemplary aspect, a method for de-duplicating blocks of data, by a read-optimized de-duplication engine implemented in a computing device comprising a processor, the method comprising: for each page of a newly received block of data, computing a page hash and assigning a page context ID, computing an index of a page node for storing the page based on the page context ID assigned to the page and a number of page nodes in a cluster and selecting the page node that matches the computed index of the page node, determining whether the selected page node contains a copy of the page, when the selected page node contains the copy of the page, adding a page reference to a block descriptor with the page being referenced by the page hash augmented by the page context ID, when the selected page node does not contain the copy of the page, storing the page in plain storage; and for the block of data, storing the block descriptor in a block node of the de-duplication engine, the block of data being referenced by a block hash and the block descriptor containing at least a list of pages of the block stored in page nodes of the de-duplication engine.

According to one aspect of the disclosure, a system is provided for de-duplicating blocks of data, the system comprising at least one processor configured to: for each page of a newly received block of data, compute a page hash and assign a page context ID, compute an index of a page node for storing the page based on the page context ID assigned to the page and a number of page nodes in a cluster and select the page node that matches the computed index of the page node, determine whether the selected page node contains a copy of the page, when the selected page node contains the copy of the page, add a page reference to a block descriptor with the page being referenced by the page hash augmented by the page context ID, when the selected page node does not contain the copy of the page, store the page in plain storage; and for the block of data, store the block descriptor in a block node of the de-duplication engine, the block of data being referenced by a block hash and the block descriptor containing at least a list of pages of the block stored in page nodes of the de-duplication engine.

In one exemplary aspect, a non-transitory computer-readable medium is provided storing a set of executable instructions thereon for de-duplicating blocks of data, including instructions for: for each page of a newly received block of data, computing a page hash and assigning a page context ID, computing an index of a page node for storing the page based on the page context ID assigned to the page and a number of page nodes in a cluster and selecting the page node that matches the computed index of the page node, determining whether the selected page node contains a copy of the page, when the selected page node contains the copy of the page, adding a page reference to a block descriptor with the page being referenced by the page hash augmented by the page context ID, when the selected page node does not contain the copy of the page, storing the page in plain storage; and for the block of data, storing the block descriptor in a block node of the de-duplication engine, the block of data being referenced by a block hash and the block descriptor containing at least a list of pages of the block stored in page nodes of the de-duplication engine.

In one aspect, the page context ID is computed as a minimum of hashes of all pages in a buffer containing the page and the fixed amount of pages preceding and following the page being considered.

In one aspect, the index of the page node is computed as a page context ID modulo of the total number of page nodes in the cluster.

In one aspect, the block hash is computed based on contents of the block of data.

In one aspect, the block hash is computed over an array of page hashes of the block.

In one aspect, the storing of the page in the page node comprises: after the index of the page node is computed, selecting a storage location within the page node based on at least one of: the page hash and the page context ID, wherein the storage location includes at least a physical storage container or a file.

In one aspect, the page is stored in the plain storage when the selected page node does not contain the copy of the page and an overhead for storing the page in the de-duplication engine outweighs an expected gain of the page being de-duplicated, and the page is stored in the de-duplication engine when the overhead for the storing of the page in the de-duplication engine does not outweigh the expected gain of the page being de-duplicated.

In one aspect, the method further comprises: periodically removing data that is no longer references by at least one page.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for a read-optimized scalable offline de-duplication of data fragments. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
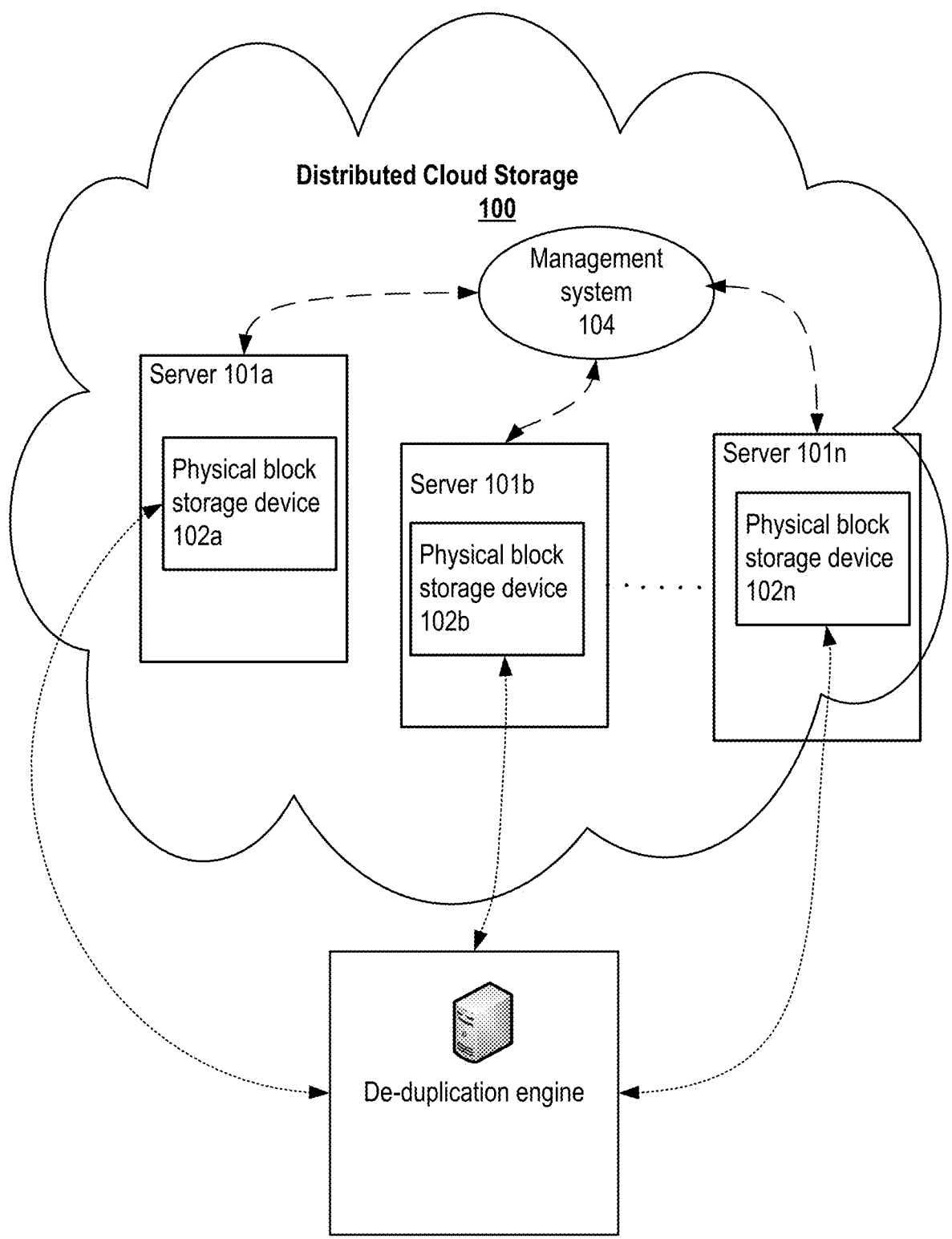
FIG. 1 is a block diagram illustrating a system for offline de-duplication in a distributed cloud storage.

FIG. 1 is a block diagram illustrating a system for offline de-duplication in a distributed cloud storage 100. The teachings of the present disclosure are described below for the scenario in which a distributed cloud storage is used for the offline de-duplication. However, without any loss of generality, the offline de-duplication of the present disclosure may be implemented in conjunction with any type of data storage known in the art.

The distributed cloud storage 100 includes a plurality of hardware servers 101a, 101b, . . . , 101n (hereafter referred to as physical servers or simply as servers). The distributed cloud storage 100 is monitored and managed by a management system 104 deployed across the plurality of servers 101a, 101b, . . . , 101n.

A server of the plurality of servers 101a, 101b, . . . , 101n may comprise any number of physical components (e.g., as shown in FIG. 13). For clarity, only physical components used to illustrate the teachings of the present disclosure are shown in FIG. 1. In other words, a server of the plurality of servers 101a, 101b, . . . , 101n comprises a number of physical components, e.g., processors, physical block storage devices (e.g., Hard Disk Drives (HDDs), Solid State Drives (SSDs), flash drives, SMR disks, etc.) or memory (e.g., Random Access Memory (RAM)), I/O interface components, etc. However, only physical block storage devices are shown in FIG. 1.

For the example of FIG. 1, server 101a includes physical block storage devices 102a, server 101b includes physical block storage device 102b, and server 101n includes physical block storage device 102n. The physical servers 101a, 101b, ..., 101n can be used for storing any type of data uploaded to storage, e.g., for storing user data, data of applications, data of Virtual Machines (VM), file systems, files, etc. Furthermore, the storage may contain VM disk images, root file systems, etc. The storage can be a part of a hyperconvergence platform. In general, the distributed cloud storage 100 may include any number of computing devices (e.g., a personal computers, laptops, servers, etc.) that include a computer processing unit ("CPU") and a memory that includes software for performing various tasks, e.g., installing an OS software, rebooting the servers, and so on.

In one aspect, the OS is configured to perform at least one of: serving request sent to the distributed cloud storage 100, and running storage services, e.g., metadata services, chunk services, data replication services, de-duplication, encryption/decryption, backup services, etc. The OS is also responsible for interaction with hardware (e.g., it contains drivers, e.g. for network interface controller). The metadata services handle/maintain and update storage metadata, e.g., which and where data chunks are stored, which clients can access the data chunks (on read/write), etc. The chunk service is responsible for storing data chunks and providing data to clients. The chunk service may also be responsible for data replication (also called for data redundancy).

The data to be de-duplicated in accordance with the teachings of the present disclosure is data stored in the distributed storage, e.g., distributed across any number of physical block storage devices 102a, 102b, ..., 102n which are located on any number of physical devices of the distributed storage, e.g., the servers 101a, 101b, ..., 101n.

As described above, previous scalable offline deduplication techniques that serve large scale storage systems keep data in large blocks, e.g., 1M byte sized blocks, with each block consisting 256 pages. Each of the large blocks are characterized by respective hashes. Then, the method finds a set of seed blocks that are similar to each other based on hash values. Newly received data blocks are processed and stored near seed blocks that are similar. However, pages located near each other in the original data block may be stored on different page nodes. Thus, processing a single read request may require issuing a large number of requests for reading individual pages.

In one aspect, the present disclosure describes a read-optimized de-duplication system that improves the efficiency of the storage system in processing read requests. In order to increase the likelihood of pages located near each other in the original data block to be stored on the same page node in the distributed storage, a context aware page addressing scheme is introduced. In order to present the teachings of the current method with clarity, the context aware addressing scheme of the present disclosure is first summarized below.

The addressing scheme of the present disclosure includes a page context identifier (ID) which is assigned to each page. It is important to note that the page context ID identifies the page node where the page will be stored. In other words, the page context ID does not identify the page itself, instead it identifies the page node where the page is to be stored. Therefore, different pages may have the same page context ID. Pages close to each other in the original data block are likely to have the same page context ID. In other words, the important property of the page context ID is that pages close to each other in the original data block are likely to be assigned the same page context ID. The computation of the page context ID is described below in conjunction with the description of FIG. 5.

Figure 2:
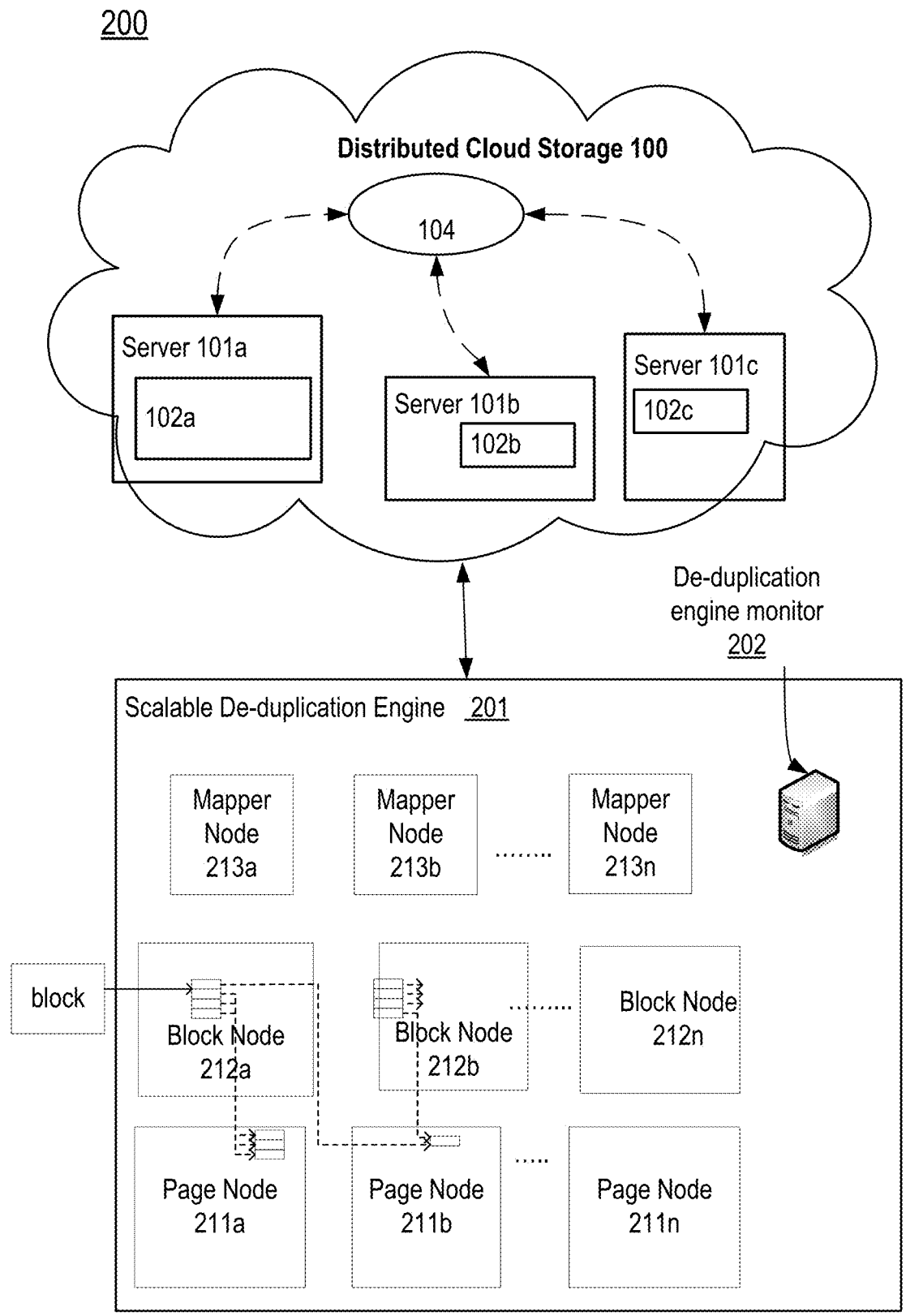
FIG. 2 is a block diagram illustrating an exemplary system with a read-optimized scalable de-duplication engine for providing offline de-duplication.

FIG. 2 is a block diagram illustrating an exemplary system 200 with a read-optimized scalable de-duplication engine 201 for providing offline de-duplication. The capacity of the de-duplication engine may be increased by adding more servers, server components, storage capacity, etc. In order to properly deal with increases and decreases in capacity, the system 200 is built from sharded services. Note that, in data storage technologies, sharding is needed when the dataset is large and cannot be stored in one database, or for building stateful services where the size of the state is too large to be served by a single physical machine. As described above, the sharding services enable splitting large homogeneous types of data into multiple databases and scaling in response to a change in a size of a service being built. The sharded services for the read-optimized scalable de-duplication engine 201 of the present disclosure include three different types of de-duplication engine components: page nodes 211a-211n, block nodes 212a-212n, and mapper nodes 213a-213n. In addition, the system 200 includes a de-duplication engine monitor service 202 that serves as a coordinator for the various operations of the de-duplication engine.

The page nodes 211a-211n are used for storing de-duplicated pages referenced by a page hash, wherein the page hash includes enough bits such that the page can be considered unique. Since the pages are referenced by their page hashes which are computed based on the contents of the pages, identical pages are stored exactly once.

The block nodes 212a-212n are used to store block descriptors, e.g., the list of pages for a particular block of data. The block nodes represent data blocks as a collection of small pages (e.g., 4 Kb in size), with each page being identified by a hash of its content. In one aspect, block descriptors are referenced by block hashes computed based on contents of the respective blocks such that identical blocks of data are stored exactly once. In one aspect, the block hashes are computed over an array of page hashes. In other words, the block hashes are computed based on the actual block content.

The mapper nodes 213a-213n are used for building a distributed scalable Bloom filter that is used for finding (locating) similar data blocks and for removing data that is no longer needed.

The particular page node that stores a given page is chosen based on the page context ID assigned to the given page. For instance, an index may be calculated for selecting a page node for storing the particular page, wherein the index is computed as the page context ID modulo of the total number of page nodes in the cluster. As noted above, pages that are next to each other in the original data block are likely to have a same page context ID. Thus, when storing pages that are next to each other in the original data block, the computed indices are likely to be the same because they are likely to be assigned the same page context ID. Namely, if two pages have a same page context ID, the computed indices for the two pages are also the same. As such, the same page node is selected for the two pages having the same page context ID.

In one aspect, for each page, once the page node is selected based on the computed index, the method of the present disclosure selects a storage location within the selected page node based on a page hash, i.e., a hash value computed based on the content of the page.

In another aspect, for each page, once the page node is selected based on the computed index, the method of the present disclosure selects a storage location within the selected page node based on the page context ID. In one aspect, the selection of the storage location within the selected page node comprises selecting a physical storage container or file. Thus, pages that are adjacent in the original data block are likely to be placed in the same physical storage container or file.

The storage of adjacent pages in the same physical storage container in accordance with the teachings of the present disclosure provides additional advantages in terms of a number of read operations that need to be performed at the disk level. Thus, the write-operation of the present disclosure for storing the pages is performed in a manner that increases efficiency for read-operations. For instance, pre-fetch mechanisms in processing read requests become more involved
  thereby reducing the number of read operations at the disk level.

Figure 3:
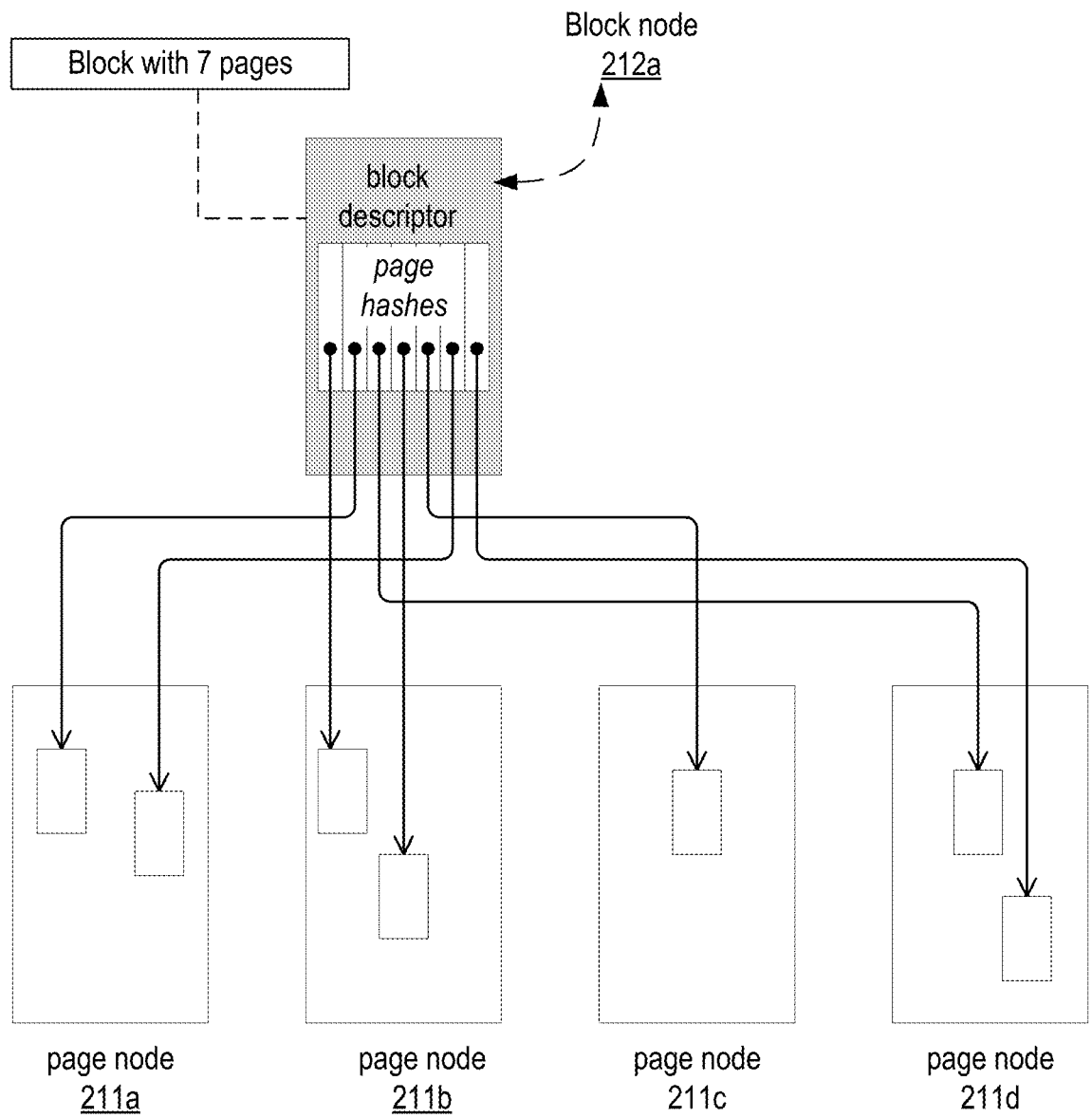
FIG. 3 is an exemplary de-duplication engine with a content based page addressing scheme without the context awareness feature.

FIG. 3 is an exemplary de-duplication engine 300 with a content based page addressing scheme without the context awareness feature. The de-duplication engine 300 includes a block node 212a, and page nodes 211a-211d. As new blocks of data are received, the block descriptor is stored in the block node 212a and the actual pages containing the data are stored in the page nodes 211a-211d. The exemplary block of data includes seven pages. For each of the seven pages, a page hash is computed from the content and used as a reference for the page. Then, the seven pages are stored in selected page nodes scattered throughout the cluster, as shown in FIG. 3.

Figure 4:
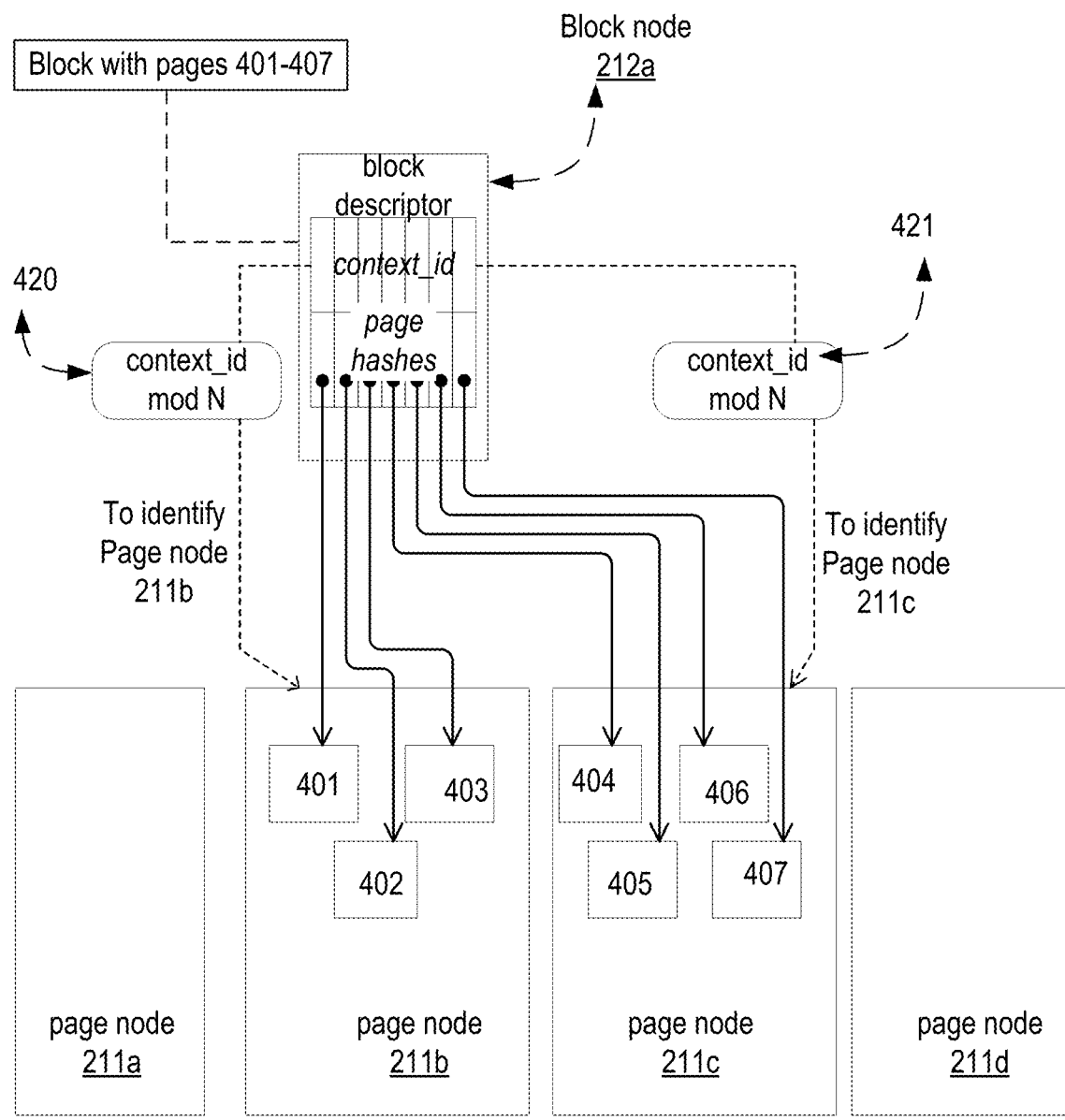
FIG. 4 is an exemplary de-duplication engine with a context aware page addressing scheme in accordance with the teachings of the present disclosure.

FIG. 4 is an exemplary de-duplication engine 400 with a context aware page addressing scheme in accordance with the teachings of the present disclosure. The de-duplication engine 400 includes the block node 212a, and page nodes 211a-211d. The block descriptor is stored in the block node 212a and the actual pages containing the data are stored in the page nodes 211a-211d. However, the de-duplication engine 400 does not scatter adjacent pages throughout the cluster. Rather, along with the page hashes described above, page context IDs are also computed for each of the seven pages. For the example of FIG. 4, the pages 401—403 have a same page context ID and pages 404—407 have a same page context ID. For example, pages 401—403 may have a first page context ID, e.g., page context ID 420, and pages 404—407 may have a second page context ID, e.g., page context ID 421.

Then, the index of a page node for storing a given page may be calculated as a page context ID modulo of the total number of page nodes in the cluster (i.e., page context ID Mod n, where n represents the number of page nodes in the cluster). Then, since the page context IDs are the same for pages 401—403, the single page node 211b is selected for pages 401—403. Similarly, the single page node 211c is selected for pages 404—407. Then, pages 401—403 are stored in page node 211b and pages 404—407 are stored in page node 211c. A comparison of FIG. 3 and FIG. 4 illustrates that the adjacent pages are stored in the same page node for the scenario of FIG. 4 but not for the scenario of FIG. 3.

Figure 5:
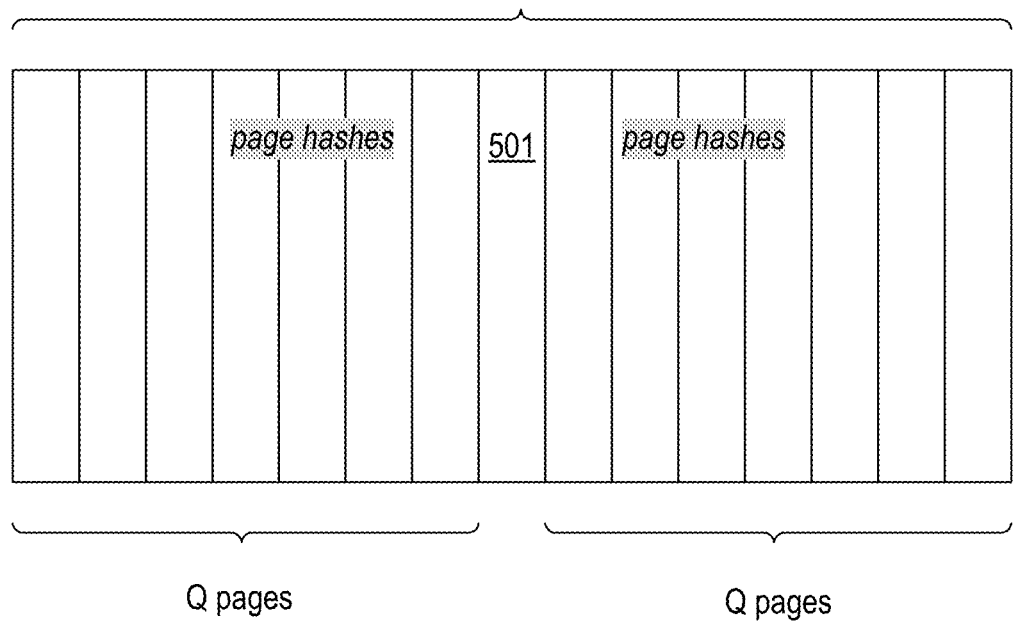
FIG. 5 illustrates an exemplary computation of a page context ID for a buffer in accordance with the teachings of the present disclosure.

Returning to the computation of the page context ID for a page, FIG. 5 illustrates an exemplary computation of a page context ID for a buffer 500 in accordance with the teachings of the present disclosure. The buffer 500 consists several pages including the page for which the page context ID is to be computed. For example, suppose the page context ID is being computed for page 501 which is proceeded by Q pages and followed by Q pages in the buffer (i.e., page 501 is in the center of a buffer of length 2Q+1).

In one aspect, the method of the present disclosure computes the page context ID as a minimum of hashes of all pages in the buffer. Then, by applying the Broder theorem, a lowest limit for the probability of two pages having the same page context ID may be found from the distance between the pages being expressed in page size units and the number of pages in the buffer. Namely, the probability of two pages having the same page context ID is determined as being no less than (2Q+1−d)/(2Q+1+d), wherein d represents the distance between pages expressed in page size units and 2Q+1 represents the number of pages in the buffer. Due to this property, pages with the same page context ID are grouped onto the runs with the mean length of the group being equal to Q+1. Thus, a desired degree of page placement locality may be achieved by varying the value of Q. The value of Q plays a role of the page placement locality parameter and should be chosen in advance. Higher values of Q lead to better read performance but degrade storage efficiency as will be discussed further.

As described above, the de-duplication engine 400 of the present disclosure includes context awareness. Suppose, a stream of data is being saved using this approach. In some scenarios, a particular page may be received several times in a stream of data. For each received copy of the particular page, a respective page context ID is computed, an index of a page node for storing the received copy is computed from the page context ID, and the copy is stored. Thus, in some scenarios the de-duplication engine 400 may store identical pages on different page nodes and/or in multiple copies. The probability of two pages having the same page context ID is equal to the Jaccard similarity index of their buffers. Suppose, the de-duplication engine 400 de-duplicates data blocks having some fraction q of unique pages. Then, in addition to the fraction of pages that are unique, another fraction of pages will not be de-duplicated since they will have page context ID different from that of their matching duplicate pages. The fraction of duplicated pages that will not be de-duplicated is approximately equal to q*(1−q). Increasing locality parameter Q will typically increase the fraction of pages that are not de-duplicated while decreasing Q will decrease it. Thus, the efficiency of the storage may be reduced.

In order to address the storage efficiency concerns, in one aspect, the method of the present disclosure implements a sparse block de-duplication algorithm.

Figure 6:
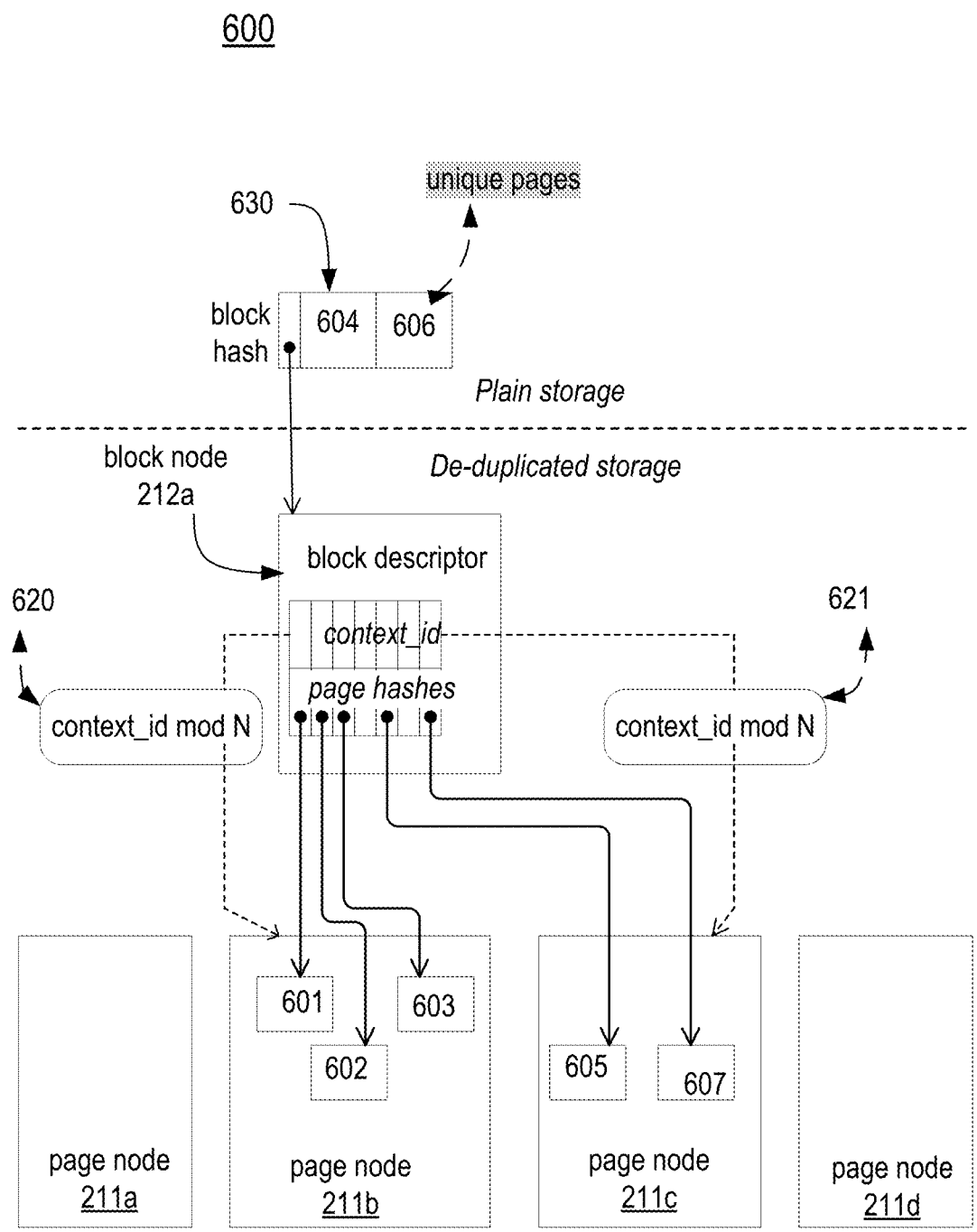
FIG. 6 is an exemplary de-duplication engine with a context aware page addressing scheme and a sparse blocks de-duplication scheme in accordance with the teachings of the present disclosure.

FIG. 6 is an exemplary de-duplication engine 600 with a context aware page addressing scheme and a sparse blocks de-duplication scheme in accordance with the teachings of the present disclosure.

The sparse blocks de-duplication scheme of the present method operates by restricting storage of pages in the de-duplicated storage. In one aspect, after storing the initial set of seed blocks the pages are stored in the de-duplicated engine only if they are already present on the page nodes selected by corresponding page context ID. Otherwise the pages are stored in the plain storage. This approach allow us to find optimal tradeoff between the overhead of storing the page in the de-duplicated engine and expected gain of the page de-duplication.

In one aspect, the method comprises: for each page, computing a page context ID; determining whether or not the page node with index calculated based on the page context ID already contains the copy of the page; when the page node already contains the copy of the page, storing reference to that copy in the block descriptor; and when the page is not present on the page node selected based on the page context ID, storing the page in plain storage and marking a block descriptor entry of the page as non-present. In other words, all pages that are not yet stored in the de-duplicated engine are left in the plain storage.

The page context IDs are computed for each of the seven pages 601-607, similar to the ones shown in FIG. 4. The de-duplication engine 600 includes the block node 212a, and page nodes 211a-211d. The block descriptor is stored in the block node 212a and the actual pages containing the data are stored in the page nodes 211a-211d or in the plain storage 630. The pages 601-603 have a same page context ID and pages 605 and 607 have a same page context ID. For example, pages 601-603 may have a first page context ID, e.g., page context ID 620, and pages 605 and 607 may have a second page context ID, e.g., page context ID 621. Suppose pages 604 and 606 are not found in the de-duplicated storage. Then, pages 601-603 are stored in page node 211b, pages 605 and 607 are stored in page node 211c, and pages 604 and 606 are stored in plain storage 630.

It is noted that the sparse blocks de-duplication scheme described above increases the efficiency of the de-duplicated storage. However, some fraction of the original data is kept in the plain storage as non-de-duplicated. The tradeoff is examined in consideration of particular encoding schemes used for plain and de-duplicated storage. For instance, compared to the design of the plain data storage, the design of the de-duplicated storage typically includes a higher storage redundancy. This is because the de-duplicated storage is a single point of failure with regard to data loss. Therefore, in some scenarios, it may be better not to move data to the de-duplicated storage unless it is actually to be de-duplicated so the data be referenced multiple times saving us the storage space. In other words, the additional redundancy of the de-duplicated storage is not needed for the fraction of data that is not going to be de-duplicated.

In one aspect, the deduplication method comprises iterative applying two de-duplication stages in sequence. During coalescing stage the set of seed data blocks with multiple copies very similar to each other is identified and added to the de-duplication engine unconditionally i.e. without applying sparse technique described above. During sedimentation stage, the data blocks similar to the seed blocks are identified and all pages that matches seed pages already stored in the de-duplication engine are de-duplicated using the sparse de-duplication technique described above.

In one aspect, the method of the present disclosure further improves the efficiency of the de-duplication engine by including a context-aware block addressing scheme that places similar blocks in a same block node. Blocks that reference a particular page are likely to reside on a same block node. Thus, storages that place similar blocks in a same block node tend to be better at utilizing caches at various levels of processing. Therefore, the method of the present disclosure places similar blocks in a same block node—thereby increasing the likelihood of data blocks that reference a particular page to reside on the same block node.

In one aspect, the context-aware block addressing scheme of the present disclosure may be implemented by adding a block node identifier (block node ID) to the addressing scheme. The block node ID is used for identifying the particular block node at which the block is placed.

In one aspect, the block node ID is based on hashes of the pages of the block. For example, for the block, a representative hash (rhash) may be determined as a minimum page hash across the pages of the block. It is noted that the Broder theorem may be used to estimate similarities between two sets $\{A_i\}$ and $\{B_j\}$ of randomly distributed numbers by comparing the minimum (or maximum) values found in the two sets. By applying the Broder theorem, the similarities of $\{A_i\}$ and $\{B_j\}$ may be estimated as: Probability [min $(\{A_i\})$==min $(\{B_j\})$]. In other words, according to the Broder theorem:

$$\text{Probability}[\min(\{A_i\})==\min(\{B_j\})] = |\{A\} \cap \{B\}| / |\{A\} \cup \{B\}| = J(\{A_i\}, \{B_j\}).$$

Thus, when the minimum values are equal, the probability is high that the sets of numbers have many elements in common. To estimate the similarity of two blocks of data, the method may then calculate some hash of every page of the block, find a minimum hash for every block, and then compare those minimum hashes. Thus, blocks that are similar may be identified using the rhash that is determined as a minimum page hash across the pages of the block.

For a block that is received, a respective block node ID is computed (e.g., rhash). Then, an index of a block node for storing the block is computed from the block node ID and the number of block nodes in the cluster. For example, the index may be computed as a block node ID modulo of the total number of block nodes in the cluster (i.e., block node ID Mod m, where m represents the number of block nodes in the cluster). That is, an index j of the block node may be chosen as j=rhash mod m.

Figure 7:
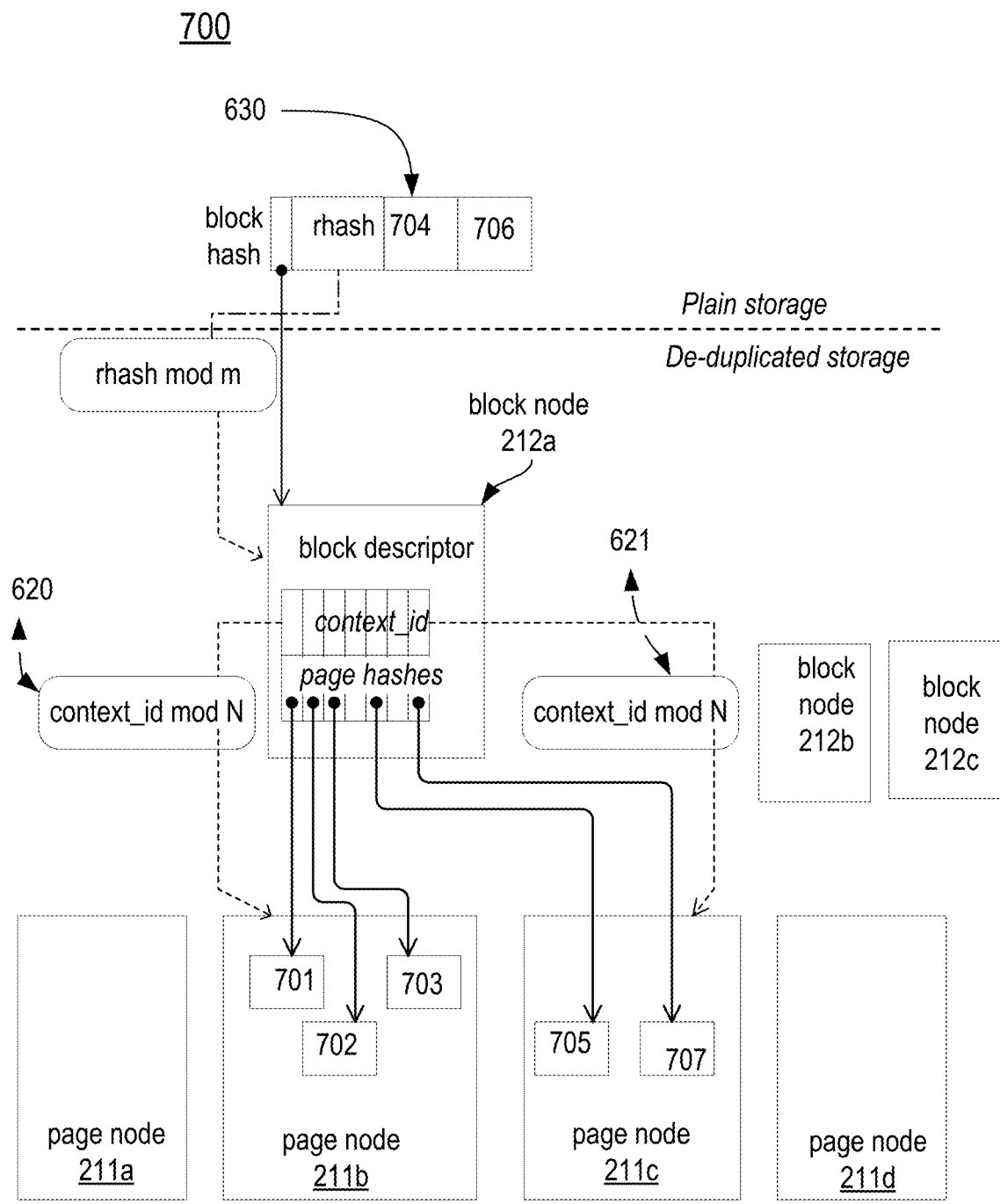
FIG. 7 is an exemplary de-duplication engine with a context aware page addressing scheme, a sparse blocks de-duplication scheme, and a context-aware block addressing scheme in accordance with the teachings of the present disclosure.

FIG. 7 is an exemplary de-duplication engine 700 with a context aware page addressing scheme, a sparse blocks de-duplication scheme, and a context-aware block addressing scheme in accordance with the teachings of the present disclosure.

The page context IDs are computed for each of the seven pages 701-707, similar to the ones shown in FIG. 6. The de-duplication engine 700 includes the block node 212a, 212b, 212c, and page nodes 211a-211d. First, the block node ID is computed for the received block (i.e., rhash is computed). Then, the index for identifying the particular block node where the block will be stored is computed from the block node ID and the number of block nodes in the cluster. For the illustration shown in FIG. 6, the index j (rhash mod m) is used to select block node 212a for storing the block. Then, the block descriptor is stored in the block node 212a and the actual pages containing the data are stored in the page nodes 211a-211d or in the plain storage 630. The pages 701-703 have a page context ID 720 and pages 705 and 707 have a page context ID 721. The page context IDs for pages 704 and 706 are not found in the de-duplicated storage. Therefore, pages 701-703 are stored in page node 211b, pages 705 and 707 are stored in page node 211c, and pages 704 and 706 are stored in plain storage 630.

Figure 8:
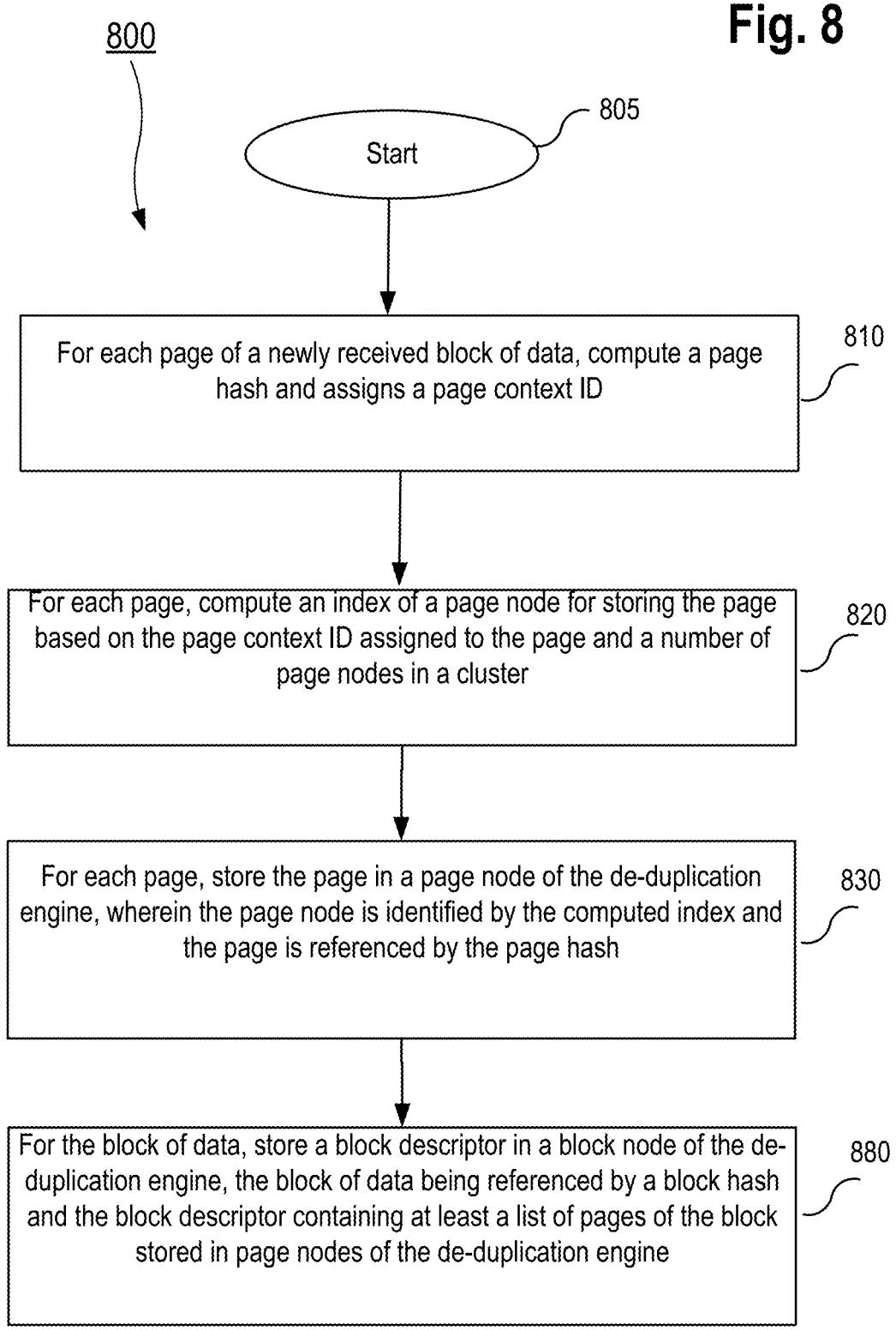
FIG. 8 illustrates a flow diagram of a method for read-optimized de-duplicating blocks of data in accordance with aspects of the present disclosure.

FIG. 8 illustrates a flow diagram of a method 800 for read-optimized de-duplicating blocks of data in accordance with aspects of the present disclosure. Method 800 stars in step 805 and proceeds to step 810. The method of the present disclosure may be implemented in a de-duplication engine, e.g., de-duplication engine 400, for providing offline de-duplication. In one aspect, the de-duplication engine comprises one or more of: page node, block node, and mapper node. In one aspect, the de-duplication engine further comprises a monitor service that serves as a coordinator for various operations of the de-duplication engine.

In step 810, for each page of a newly received block of data, method 800 computes a page hash and assigns a page context ID.

In step 820, for each page, method 800 computes an index of a page node for storing the page based on the page context ID assigned to the page and a number of page nodes in a cluster.

In step 830, for each page, method 800 stores the page in a page node of the de-duplication engine, wherein the page node is identified by the computed index and the page is referenced by the page hash.

In step 880, for the block of data, method 800 stores a block descriptor in a block node of the de-duplication engine, the block of data being referenced by a block hash and the block descriptor containing at least a list of pages of the block stored in page nodes of the de-duplication engine.

In one aspect, the page context ID is computed as a minimum of hashes of all pages in a buffer containing the page and the fixed amount of pages preceding and following the page being considered.

In one aspect, the index of the page node is computed as a page context ID modulo of the total number of page nodes in the cluster.

In one aspect, the block hash is computed based on contents of the block of data.

In one aspect, the block hash is computed over an array of page hashes of the block.

In one aspect, the storing of the page in the page node comprises: after the index of the page node is computed, selecting a storage location within the page node based on at least one of: the page hash and the page context ID, wherein the storage location includes at least a physical storage container or a file.

In one aspect, method 800 further comprises: periodically removing data that is no longer references by at least one page. For example, a mapper node of the de-duplication engine may be used for periodically removing data that is no longer needed.

In one aspect, the mapper node may also be used for building a filter (e.g., a Bloom filter) that is used for locating blocks of data that are similar.

Figure 9:
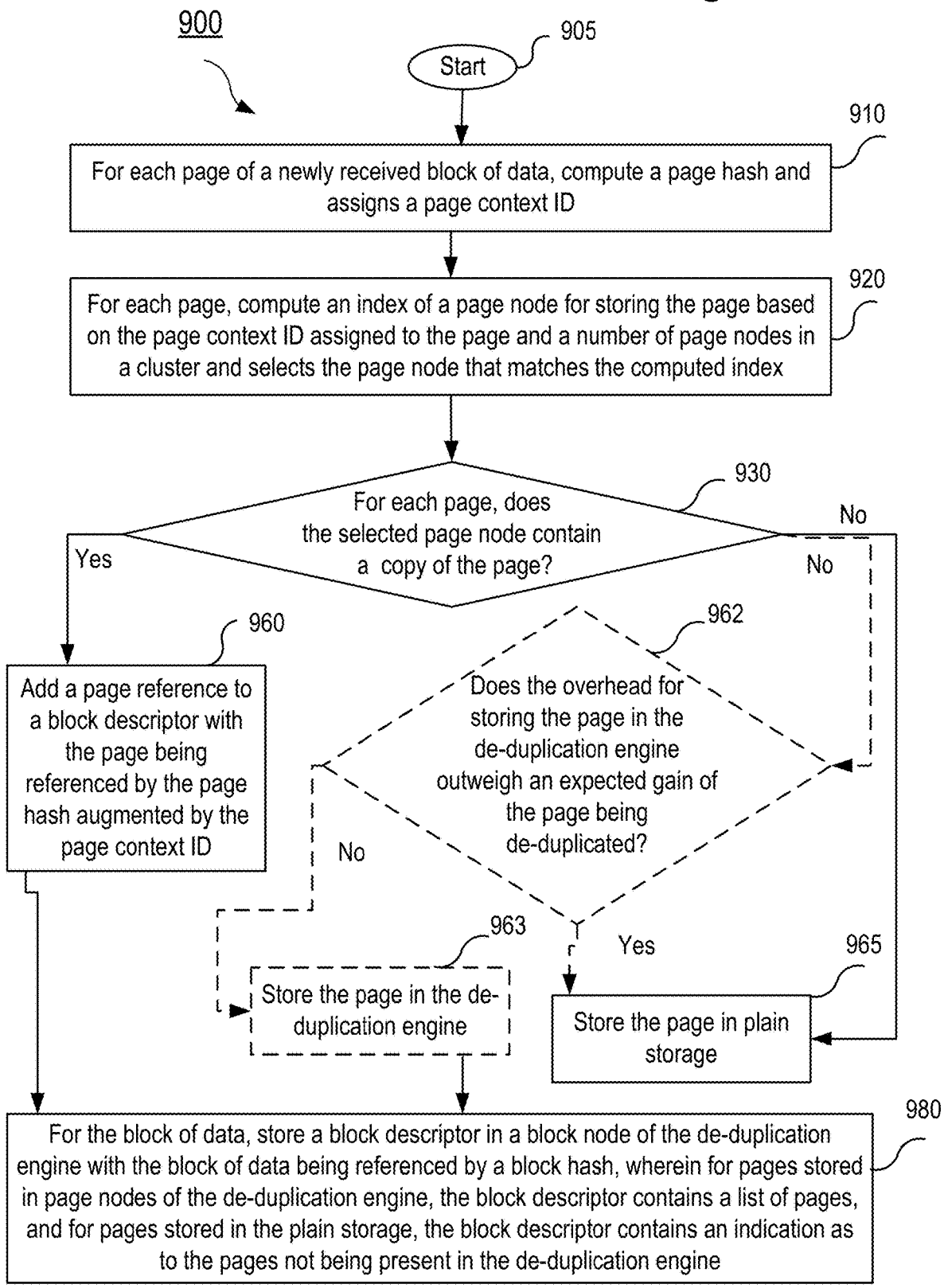
FIG. 9 illustrates a flow diagram of a method for read-optimized de-duplicating of blocks of data in accordance with a sparse blocks de-duplication scheme of the present disclosure.

FIG. 9 illustrates a flow diagram of a method 900 for read-optimized de-duplicating of blocks of data in accordance with a sparse blocks de-duplication scheme of the present disclosure. Method 900 stars in step 905 and proceeds to step 910.

In step 910, for each page of a newly received block of data, method 900 computes a page hash and assigns a page context ID.

In step 920, for each page, method 900 computes an index of a page node for storing the page based on the page context ID assigned to the page and a number of page nodes in a cluster, and selects the page node that matches the computed index.

In step 930, for each page, method 900 determines whether or not the selected page node contains a copy of the page. When the selected page node contains the copy of the page, method 900 proceeds to step 960. Otherwise, method 900 proceeds either to step 962 or 965, depending on whether the optional step 962 is implemented.

In step 960, for each page, when the selected page node already has the copy of the page, method 900 adds a page reference to a block descriptor with the page being referenced by the page hash augmented by the page context ID. The method then proceeds to step 980.

In an optional step 962, for each page, when the selected page node does not contain the copy of the page, method 900 determines whether or not an overhead for storing the page in the de-duplication engine outweighs an expected gain of the page being de-duplicated. For example, the method compares the overhead (e.g., needed resources) for storing the page in the de-duplication engine against an expected gain from the page being subsequently de-duplicated. When the overhead for storing the page in the de-duplication engine outweighs the expected gain from the de-duplication of the page, the method proceeds to step 965. When the expected gain from the de-duplication outweighs the overhead needed for storing the page in the de-duplication engine, method 900 proceeds to optional step 963.

In optional step 963, method 900 stores the page in the de-duplication engine and proceeds to step 980.

In step 965, for each page, when the selected page node does not contain the copy of the page, method 900 stores the page in plain storage.

In step 980, for the block of data, method 900 stores a block descriptor in a block node of the de-duplication engine with the block of data being referenced by a block hash, wherein for pages stored in page nodes of the de-duplication engine, the block descriptor contains a list of pages, and for pages stored in the plain storage, the block descriptor contains an indication as to the pages not being present in the de-duplication engine.

In one aspect, the block node is selected from among a plurality of block nodes of the de-duplication engine based on block node IDs assigned to each block and a number of block nodes in the cluster.

In one aspect, the selection of the block node comprises: for each of the plurality of block nodes, assigning a block node ID based on a representative hash of the respective block, computing an index as a block node ID modulo of the total number of block nodes in the cluster, and selecting the block node matching the computed index for storing the block.

In one aspect, for each block of data, the block node ID assigned to the block is computed from hashes of the pages of the block.

In one aspect, the block node ID assigned to the block is computed as a minimum page hash across pages of the block.

In one aspect, the block node ID assigned to the block is computed as a maximum page hash across pages of the block.

Figure 10:
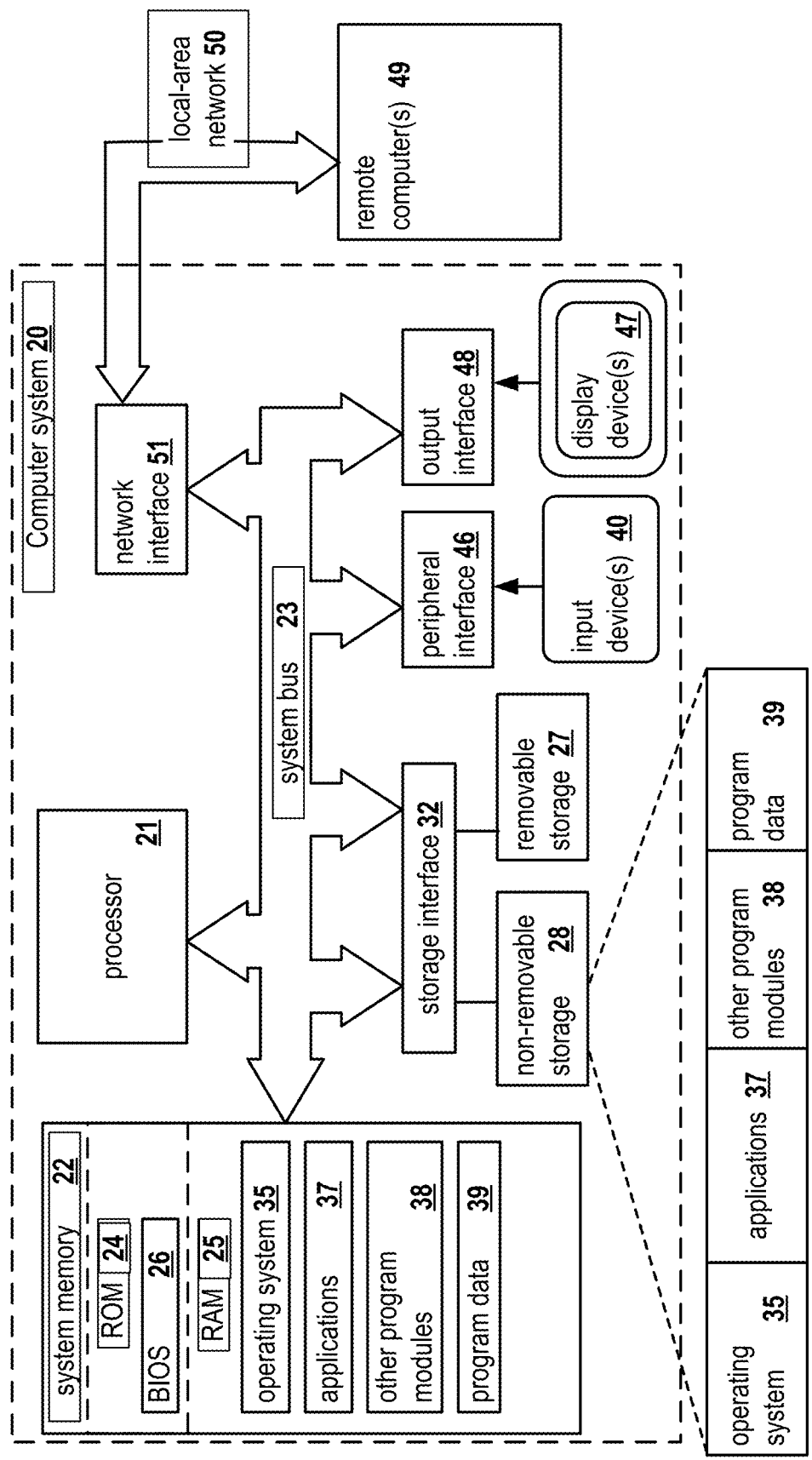
FIG. 10 presents an example of a general-purpose computer system on which aspects of the present disclosure can be implemented.

FIG. 10 is a block diagram illustrating a computer system 20 on which aspects of systems and methods for read-optimized de-duplicating blocks of data offline may be implemented in accordance with an exemplary aspect. It should be noted that the computer system 20 can correspond to elements of the de-duplication engine 401, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for read-optimized de-duplicating blocks of data, the method comprising:
   for each page of a newly received block of data, computing a page hash and assigning a page context ID, wherein the page context ID is computed as a minimum of hashes of all pages in a buffer containing the page and a fixed amount of pages preceding and following the page in the block of data;
   for each page, computing an index of a page node for storing the page based on the page context ID assigned to the page and a number of page nodes in a cluster and selecting the page node that matches the computed index of the page node;
   for each page, determining whether the selected page node contains a copy of the page;
   for each page, when the selected page node contains the copy of the page, adding a page reference to a block descriptor with the page being referenced by the page hash augmented by the page context ID;
   for each page, when the selected page node does not contain the copy of the page, storing the page in plain storage; and
   for the block of data, storing the block descriptor in a block node of a de-duplication engine, the block of data being referenced by a block hash and the block descriptor containing at least a list of pages of the block stored in page nodes of the de-duplication engine.

2. The method of claim 1, wherein the index of the page node is computed as a page context ID modulo of a total number of page nodes in the cluster.

3. The method of claim 1, wherein the block hash is computed based on contents of the block of data.

4. The method of claim 1, wherein the block hash is computed over an array of page hashes of the block.

5. The method of claim 1, wherein the storing of the page in the page node comprises: after the index of the page node is computed, selecting a storage location within the page node based on at least one of: the page hash and the page context ID, wherein the storage location includes at least a physical storage container or a file.

6. The method of claim 1, wherein the page is stored in the plain storage when the selected page node does not contain the copy of the page and an overhead for storing the page in the de-duplication engine outweighs an expected gain of the page being de-duplicated, and the page is stored in the de-duplication engine when the overhead for the storing of the page in the de-duplication engine does not outweigh the expected gain of the page being de-duplicated.

7. The method of claim 1, further comprising:
   periodically removing data that is no longer references by at least one page.

8. A system for read-optimized de-duplicating of blocks of data, comprising:
   at least one processor of a server, the processor configured to:
      for each page of a newly received block of data, compute a page hash and assign a page context ID, wherein the page context ID is computed as a minimum of hashes of all pages in a buffer containing the page and a fixed amount of pages preceding and following the page in the block of data;
      for each page, compute an index of a page node for storing the page based on the page context ID assigned to the page and a number of page nodes in a cluster and select the page node that matches the computed index of the page node;
      for each page, determine whether the selected page node contains a copy of the page;
      for each page, when the selected page node contains the copy of the page, add a page reference to a block descriptor with the page being referenced by the page hash augmented by the page context ID;
      for each page, when the selected page node does not contain the copy of the page, store the page in plain storage; and
      for the block of data, store the block descriptor in a block node of a de-duplication engine, the block of data being referenced by a block hash and the block descriptor containing at least a list of pages of the block stored in page nodes of the de-duplication engine.

9. The system of claim 8, wherein the index of the page node is computed as a page context ID modulo of a total number of page nodes in the cluster.

10. The system of claim 8, wherein the block hash is computed based on contents of the block of data.

11. The system of claim 8, wherein the block hash is computed over an array of page hashes of the block.

12. The system of claim 8, wherein the storing of the page in the page node comprises: after the index of the page node is computed, selecting a storage location within the page node based on at least one of: the page hash and the page context ID, wherein the storage location includes at least a physical storage container or a file.

13. The system of claim 8, wherein the page is stored in the plain storage when the selected page node does not contain the copy of the page and an overhead for storing the page in the de-duplication engine outweighs an expected gain of the page being de-duplicated, and the page is stored in the de-duplication engine when the overhead for the storing of the page in the de-duplication engine does not outweigh the expected gain of the page being de-duplicated.

14. The system of claim 8, the configuration further comprising a configuration for:
   periodically removing data that is no longer references by at least one page.

15. A non-transitory computer readable medium storing thereon computer executable instructions for read-optimized de-duplication of blocks of data, including instructions for:
   for each page of a newly received block of data, computing a page hash and assigning a page context ID, wherein the page context ID is computed as a minimum of hashes of all pages in a buffer containing the page and a fixed amount of pages preceding and following the page in the block of data;
   for each page, computing an index of a page node for storing the page based on the page context ID assigned to the page and a number of page nodes in a cluster and selecting the page node that matches the computed index of the page node;
   for each page, determining whether the selected page node contains a copy of the page;
   for each page, when the selected page node contains the copy of the page, adding a page reference to a block descriptor with the page being referenced by the page hash augmented by the page context ID;
   for each page, when the selected page node does not contain the copy of the page, storing the page in plain storage; and
   for the block of data, storing the block descriptor in a block node of a de-duplication engine, the block of data being referenced by a block hash and the block descriptor containing at least a list of pages of the block stored in page nodes of the de-duplication engine.

16. The non-transitory computer readable medium of claim 15, wherein the index of the page node is computed as a page context ID modulo of a total number of page nodes in the cluster.

17. The non-transitory computer readable medium of claim 15, wherein the block hash is computed based on contents of the block of data.

* * * * *